US012232534B2

(12) United States Patent
Rogan et al.

(10) Patent No.: US 12,232,534 B2
(45) Date of Patent: Feb. 25, 2025

(54) AEROSOL GENERATING ARTICLE AND AN AEROSOL GENERATING SYSTEM

(71) Applicant: JT International SA, Geneva (CH)

(72) Inventors: Andrew Robert John Rogan, Forres (GB); Stella Foaleng, Montherod (CH); Roberto Franz, Nyon (CH)

(73) Assignee: JT International S.A. (CH)

( * ) Notice: Subject to any disclaimer, the term of this patent is extended or adjusted under 35 U.S.C. 154(b) by 352 days.

(21) Appl. No.: 17/777,508

(22) PCT Filed: Nov. 16, 2020

(86) PCT No.: PCT/EP2020/082174
§ 371 (c)(1),
(2) Date: May 17, 2022

(87) PCT Pub. No.: WO2021/099231
PCT Pub. Date: May 27, 2021

(65) Prior Publication Data

US 2023/0148670 A1 May 18, 2023

(30) Foreign Application Priority Data

Nov. 18, 2019 (EP) .................................... 19209623

(51) Int. Cl.

| | |
|---|---|
| ***A24F 40/465*** | (2020.01) |
| ***A24D 1/20*** | (2020.01) |
| ***A24F 40/20*** | (2020.01) |
| ***A24F 40/30*** | (2020.01) |
| ***H05B 6/36*** | (2006.01) |

(52) U.S. Cl.
CPC .............. *A24F 40/465* (2020.01); *A24D 1/20* (2020.01); *A24F 40/20* (2020.01); *A24F 40/30* (2020.01); *H05B 6/36* (2013.01)

(58) Field of Classification Search
CPC ..................................................... A24F 40/465
See application file for complete search history.

(56) References Cited

U.S. PATENT DOCUMENTS

2018/0184713 A1* 7/2018 Mironov ................. A24F 40/30

FOREIGN PATENT DOCUMENTS

| | | |
|---|---|---|
| JP | 2018-527889 A | 9/2018 |
| RU | 2702397 C2 | 10/2019 |
| RU | 2703099 C2 | 10/2019 |

(Continued)

OTHER PUBLICATIONS

International Search Report for PCT/EP2020/082174 dated Feb. 9, 2021. 5 pgs.

(Continued)

*Primary Examiner* — Cynthia Szewczyk
(74) *Attorney, Agent, or Firm* — Lerner David LLP

(57) ABSTRACT

An aerosol generating article for use with an aerosol generating device including a magnetic field generator includes first and second discrete compartments configured to contain respectively a first aerosol generating substance and a second aerosol generating substance, and an inductively heatable susceptor configured to be inductively heated by the magnetic field generator. The inductively heatable susceptor has a first part positioned in the first compartment and a second part positioned in the second compartment.

14 Claims, 2 Drawing Sheets

(56) References Cited

FOREIGN PATENT DOCUMENTS

| | | | |
|---|---|---|---|
| WO | 2017001820 | A1 | 1/2017 |
| WO | 2017029268 | A1 | 2/2017 |
| WO | 2017029269 | A1 | 2/2017 |
| WO | 2017068100 | A1 | 4/2017 |
| WO | 2019219740 | A1 | 11/2019 |

OTHER PUBLICATIONS

International Search Report for PCT/EP2020/082175 dated Feb. 9, 2021. 5 pgs.

* cited by examiner

AEROSOL GENERATING ARTICLE AND AN AEROSOL GENERATING SYSTEM

CROSS-REFERENCE TO RELATED APPLICATIONS

The present application is a national phase entry under 35 U.S.C. § 371 of International Application No. PCT/EP2020/082174, filed Nov. 16, 2020, published in English, which claims priority to European Application No. 19209623.8 filed Nov. 18, 2019, the disclosures of which are incorporated herein by reference.

TECHNICAL FIELD

The present disclosure relates generally to aerosol generating articles, and more particularly to an aerosol generating article for use with an aerosol generating device for heating the aerosol generating article to generate an aerosol for inhalation by a user. Embodiments of the present disclosure also relate to an aerosol generating system comprising an aerosol generating device and an aerosol generating article.

TECHNICAL BACKGROUND

Devices which heat, rather than burn, an aerosol generating substance (liquid or non-liquid) to produce an aerosol for inhalation have become popular with consumers in recent years. Such devices can use one of a number of different approaches to provide heat to the aerosol generating substance.

One approach is to provide an aerosol generating device which employs a resistive heating system. In such a device, a resistive heating element is provided to heat the aerosol generating substance and thereby generate a vapour which typically cools and condenses to form an aerosol for inhalation by a user of the device.

Another approach is to provide an aerosol generating device which employs an induction heating system. In such a device, an induction coil and a susceptor are provided. Electrical energy is supplied to the induction coil when a user activates the device which in turn generates an alternating electromagnetic field. The susceptor couples with the electromagnetic field and generates heat which is transferred, for example by conduction, to the aerosol generating substance thereby generating a vapour which typically cools and condenses to form an aerosol for inhalation by a user of the device.

Embodiments of the present disclosure seek to provide optimum heating of the aerosol generating substance which is necessary for effective aerosol generation.

SUMMARY OF THE DISCLOSURE

According to a first aspect of the present disclosure, there is provided an aerosol generating article for use with an aerosol generating device including a magnetic field generator, the aerosol generating article comprising:

first and second discrete compartments configured to contain respectively a first aerosol generating substance and a second aerosol generating substance; and an inductively heatable susceptor configured to be inductively heated by the magnetic field generator, the inductively heatable susceptor having a first part positioned in the first compartment and a second part positioned in the second compartment.

The aerosol generating article is intended for use with an aerosol generating device for heating the first and second aerosol generating substances, without burning the aerosol generating substances, to volatise at least one component of the first and second aerosol generating substances and thereby generate a vapour which cools and condenses to form an aerosol for inhalation by a user of the aerosol generating device.

According to a second aspect of the present disclosure, there is provided an aerosol generating system comprising:

a magnetic field generator comprising a substantially helical induction coil having a longitudinal axis; and an aerosol generating article according to the first aspect, wherein:

the first and second compartments are positioned inside the helical induction coil; and the first part of the inductively heatable susceptor extends in a direction substantially parallel to the longitudinal axis of the induction coil and the second part of the inductively heatable susceptor extends in a direction that intersects the first part.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

The provision of first and second aerosol generating substances in corresponding first and second discrete compartments, along with an inductively heatable susceptor having first and second parts, enables the first and second aerosol generating substances to be individually heated. This in turn allows the heating of the first and second aerosol generating substances to be adapted for the particular substances so that an aerosol with improved characteristics can be generated for an enhanced user experience.

The first and second parts of the inductively heatable susceptor may be configured to be heated to first and second temperatures respectively. One of the first and second temperatures may be higher than the other of the first and second temperatures. The first and second aerosol generating substances may have different vaporisation temperatures and heating of the first and second parts of the inductively heatable susceptor to different first and second temperatures may, thus, provide for the generation of an aerosol with improved characteristics.

In some embodiments, the first and second aerosol generating substances may comprise respectively first and second aerosol generating liquids, and the first temperature may be higher than the boiling temperature of the first aerosol generating liquid and the second temperature may be higher than the boiling temperature of the second aerosol generating liquid.

In some embodiments, one of the first and second aerosol generating substances may comprise a nicotine source which releases nicotine vapour when heated, and the other one of the first and second aerosol generating substances may comprise a delivery enhancing compound. The delivery enhancing compound releases a second vapour when heated. The nicotine vapour reacts with the second vapour in the gas phase to form an aerosol comprising nicotine salt particles that is delivered to the downstream end of the aerosol generating device/system to be inhaled by the user.

The nicotine source may comprise one or more of nicotine, a nicotine salt, or a nicotine derivative. The nicotine source may comprise natural nicotine or synthetic nicotine. The nicotine source may comprise pure nicotine, a solution of nicotine, or a liquid tobacco extract. The delivery enhancing compound may comprise an acid such as pyruvic acid or lactic acid.

The aerosol generating device/system may comprise a reaction chamber located downstream of both the first and second compartments. The reaction chamber may be configured to receive the released nicotine vapour and second vapour and allow them to react to form the aerosol for inhalation. The reaction chamber may form part of the aerosol generating device and may typically be located between an aerosol generating space (e.g. a cavity) adapted to receive the aerosol generating article and a mouthpiece. Alternatively, the reaction chamber may form a part of the aerosol generating article.

Each of the first and second aerosol generating substances may comprise a solid matrix and the first and second parts of the inductively heatable susceptor may be secured in the solid matrix. The first and second parts of the inductively heatable susceptor are held securely in place in the solid matrix. In addition, such an arrangement may facilitate uniform heat transfer from the first and second parts of the inductively heatable susceptor respectively to the first and second aerosol generating substances and/or may facilitate manufacture of the aerosol generating article.

The solid matrix may comprise at least one of a porous ceramic and foam material. The foam material may be a mousse and may comprise tobacco. Thus, the mousse may comprise a tobacco mousse, a reconstituted tobacco (RTB) mousse or an e-liquid mousse.

The foam material may comprise a plurality of fine particles (e.g. tobacco particles). The tobacco particles may have a particle size between 50 and 180 μm. The foam material may further comprise an aerosol forming agent such as propylene glycol, glycerol or a combination thereof. The aerosol forming agent can further comprise water. The foam material may further comprise a solvent and/or an acid and/or an ester. The foam material may further comprise a foam forming agent. The foam forming agent may be non-protein containing polysaccharide. The foam forming agent may be selected from the group consisting of agar, gellan gum, lecithin, polyglycerol esters of fatty acids, glycerol esters of fatty acids, sorbitan esters of fatty acids, and/or mixtures thereof, without being limited thereto. The foam material may comprise a foam stabilizing agent. The foam stabilizing agent may comprise cellulose gum, hydroxyalkylated carbohydrates, derivatives thereof, e.g. salts thereof, preferably alkali metal salts thereof, e.g. sodium and/or potassium salts thereof, and mixtures thereof.

The first and second parts of the inductively heatable susceptor may be positioned in use with respect to the magnetic field generator so that the first part is heated to the first temperature more rapidly than the second part is heated to the second temperature. Controlling the rate of heating of the first and second parts of the inductively heatable susceptor may provide for the generation of an aerosol with improved characteristics. The rate of heating of the first and second parts of the inductively heatable susceptor may be controlled by varying any one or more of the shape and/or size of the first and second parts of the inductively heatable susceptor, the positions and/or orientations of the first and second parts of the inductively heatable susceptor with respect to the magnetic field generator, or the material from which the first and second parts of the inductively heatable susceptor are formed.

The first and second parts of the inductively heatable susceptor may be configured to have different orientations from each other with respect to the magnetic field generator. The use of different orientations may be employed to control the rate of heating of the first and second parts of the inductively heatable susceptor. For example, the first and second parts may be oriented so that there is a stronger electromagnetic coupling between the first part and the magnetic field generator than between the second part and the magnetic field generator. Thus, the first part may be heated to a first temperature which is higher than the second temperature to which the second part is heated and/or the first part may be heated to the first temperature more rapidly than the second part is heated to the second temperature.

The first part of the inductively heatable susceptor may comprise an inductively heatable material and the second part of the inductively heatable susceptor may comprise a non-inductively heatable material. With this arrangement, the second part of the inductively heatable susceptor is configured to be heated conductively by heat generated in the first part. Such an arrangement may provide for conductive heating of the second part to a second temperature which is lower than the first temperature achieved by inductively heating the first part and/or may provide for a slower rate of heating of the second part relative to the first part.

The inductively heatable susceptor may comprise a plate susceptor which may be shaped so that the second part extends from the first compartment into the second compartment. This may facilitate manufacture of the susceptor, and thereby facilitate manufacture of the aerosol generating article.

The first and second compartments may be separated by a substantially fluid-impermeable partition wall. The first and second aerosol generating substances can be reliably contained within their respective first and second discrete compartments by the fluid-impermeable partition wall.

The partition wall may comprise a thermally insulating material. The thermally insulating material may be configured to minimise heat transfer between the first and second compartments. By minimising heat transfer between the first and second compartments, the heating of the first and second aerosol generating substances by the first and second parts of the inductively heatable susceptor can be carefully controlled to provide for the generation of an aerosol with the desired characteristics.

The inductively heatable susceptor may extend through the partition wall. Thus, the first part can be located in the first compartment and the second part can be located in the second compartment in a convenient manner which may facilitate manufacture of the aerosol generating article.

The second part of the inductively heatable susceptor may extend in a direction which is substantially perpendicular to the first part. This may allow for a stronger electromagnetic coupling between the first part of the inductively heatable susceptor and the magnetic field generator, for example whilst allowing the second part to easily extend through the partition wall from the first compartment into the second compartment.

The aerosol generating system according to the second aspect may further comprise an aerosol generating device in which the magnetic field generator is incorporated. The aerosol generating device may include a cavity having a longitudinal axis, and the helical induction coil may extend around the cavity such that the longitudinal axes of the helical induction coil and the cavity are substantially parallel. With such an arrangement, the first part of the inductively heatable susceptor may be substantially parallel to a longitudinal axis of the induction coil when the aerosol generating article is positioned in the cavity. This in turn may ensure a strong electromagnetic coupling between the first part of the inductively heatable susceptor and the induction coil, possibly enabling the first part to be heated to a first temperature which is higher than the second temperature to which the second part is heated and/or possibly enabling the first part to be heated to the first temperature more rapidly than the second part is heated to the second temperature.

The induction coil may comprise any suitable material, for example a Litz wire or a Litz cable.

The inductively heatable susceptor may comprise at least one of a metal material, a metal alloy material, a ceramic material, a carbon material, and a polymeric fibre material coated with a metal material. The inductively heatable susceptor may comprise one or more, but not limited, of aluminium, iron, nickel, stainless steel and alloys thereof, e.g. Nickel Chromium or Nickel Copper. With the application of an electromagnetic field in its vicinity, the inductively heatable susceptor may generate heat due to eddy currents and/or magnetic hysteresis losses resulting in a conversion of energy from electromagnetic to heat.

The first and/or second aerosol generating substance(s) may comprise an aerosol generating liquid.

The first and/or second aerosol generating substance(s) may comprise a non-liquid aerosol generating substance, for example any type of solid or semi-solid material. Example types of aerosol generating solids include powder, granules, pellets, shreds, strands, particles, gel, strips, loose leaves, cut leaves, cut filler, porous material, foam material or sheets. The non-liquid aerosol generating material may comprise plant derived material and in particular, may comprise tobacco. It may advantageously comprise reconstituted tobacco.

The first and/or second aerosol generating substance(s) may comprise an aerosol-former. Examples of aerosol-formers include polyhydric alcohols and mixtures thereof such as glycerine or propylene glycol. Typically, the first and/or second aerosol generating substance(s) may comprise an aerosol-former content of between approximately 5% and approximately 50% on a dry weight basis. In some embodiments, the first and/or second aerosol generating substance(s) may comprise an aerosol-former content of between approximately 10% and approximately 20% on a dry weight basis, and possibly approximately 15% on a dry weight basis.

Upon heating, the first and second aerosol generating substances may release volatile compounds. The volatile compounds may include nicotine or flavour compounds such as tobacco flavouring.

The magnetic field generator may be arranged to operate in use with a fluctuating electromagnetic field having a magnetic flux density of between approximately 20 mT and approximately 2.0 T at the point of highest concentration.

The magnetic field generator may include a power source and circuitry which may be configured to operate at a high frequency. The power source and circuitry may be configured to operate at a frequency of between approximately 80 kHz and 500 kHz, possibly between approximately 150 kHz and 250 kHz, and possibly at approximately 200 kHz. The power source and circuitry could be configured to operate at a higher frequency, for example in the MHz range, depending on the type of inductively heatable susceptor that is used.

In embodiments in which the first and second aerosol generating substances comprise a non-liquid aerosol generating material, the aerosol generating article may comprise an air-permeable shell which includes the first and second discrete compartments. The air-permeable shell may comprise an air permeable material which is electrically insulating and non-magnetic. The material may have a high air permeability to allow air to flow through the material with a resistance to high temperatures. Examples of suitable air permeable materials include cellulose fibres, paper, cotton and silk. The air-permeable material may also act as a filter.

DETAILED DESCRIPTION OF EMBODIMENTS

Embodiments of the present disclosure will now be described by way of example only and with reference to the accompanying drawings.

Figure 1:
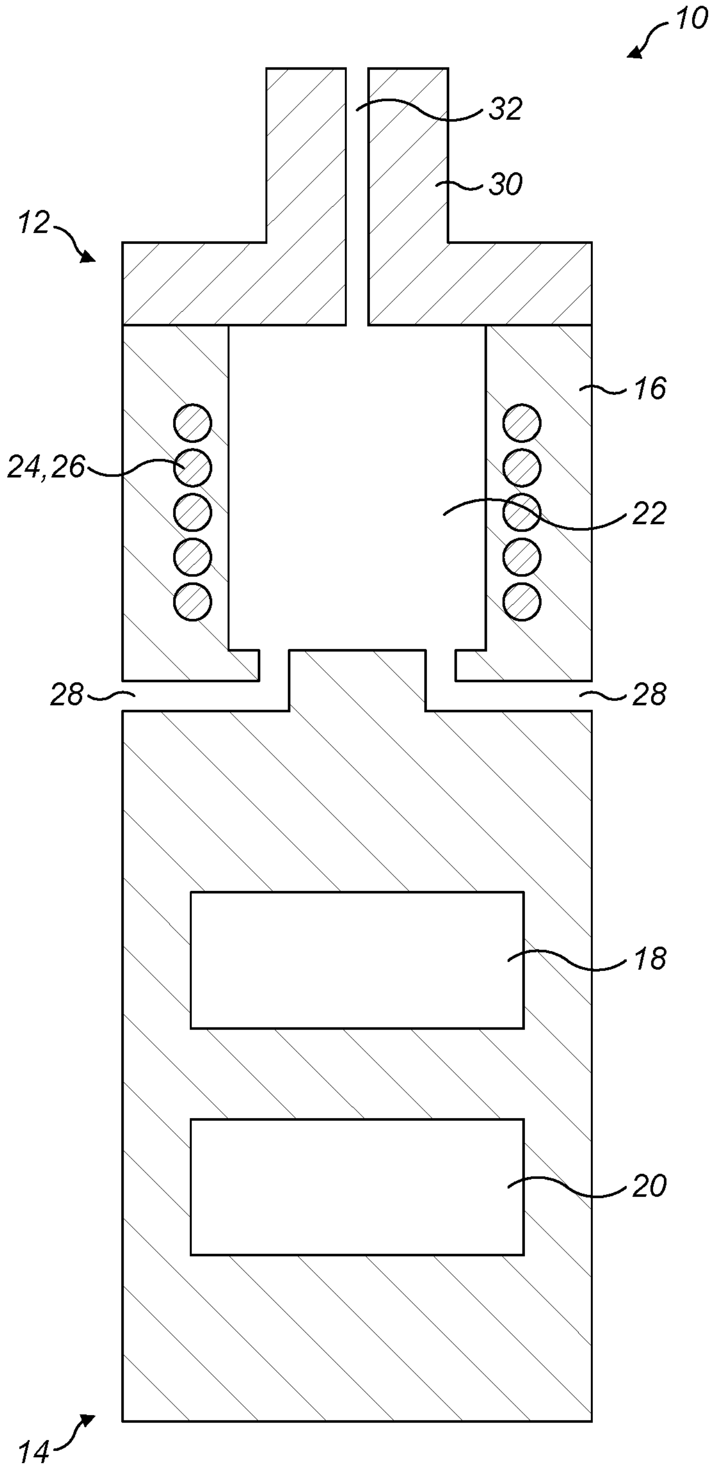
FIG. 1 is a diagrammatic cross-sectional view of an aerosol generating device.
Figure 2:
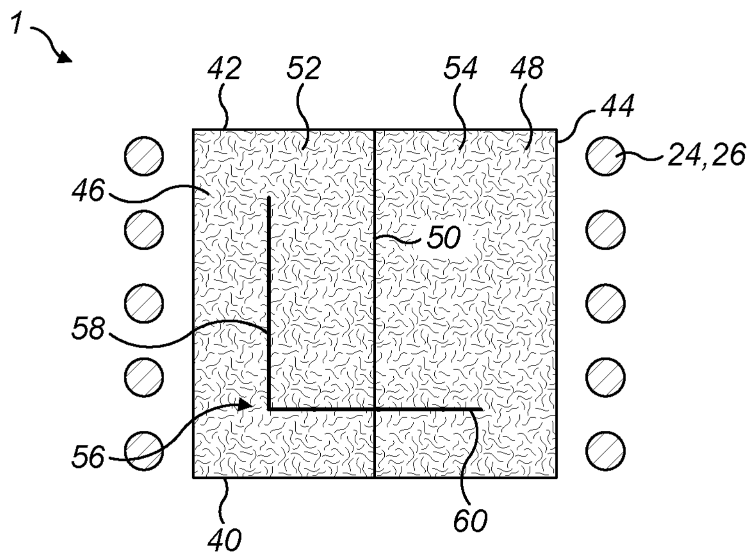
FIG. 2 is a diagrammatic cross-sectional view of a first example of an aerosol generating article for use with the aerosol generating device of FIG. 1.
Figure 3:
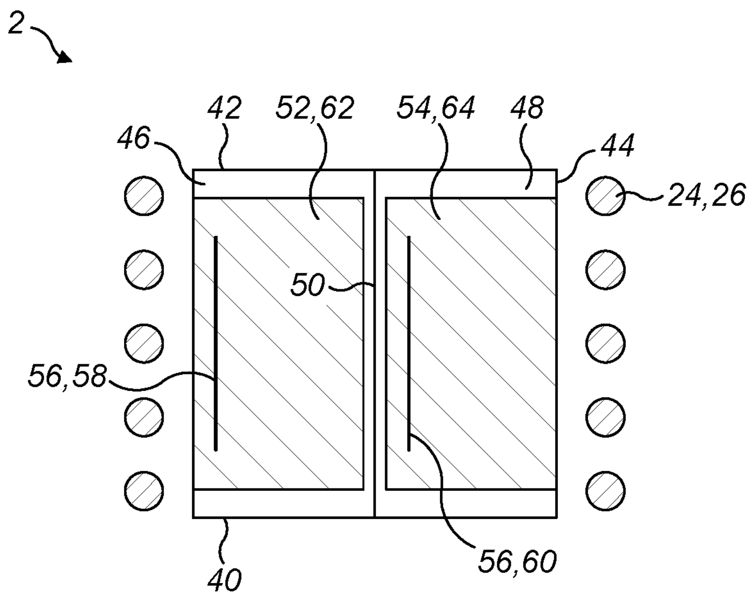
FIG. 3 is a diagrammatic cross-sectional view of a second example of an aerosol generating article for use with the aerosol generating device of FIG. 1.

Referring initially to FIG. 1, there is shown diagrammatically an example of an aerosol generating device 10 for use with a "pod-type" aerosol generating article, and in particular the first and second examples of the aerosol generating articles 1, 2 illustrated in FIGS. 2 and 3. The aerosol generating device 10 has a proximal end 12 and a distal end 14 and comprises a device body 16 which includes a power source 18 and a controller 20 which may be configured to operate at high frequency. The power source 18 typically comprises one or more batteries which could, for example, be inductively rechargeable.

The aerosol generating device 10 is generally cylindrical and comprises a generally cylindrical aerosol generating space 22, for example in the form of a cavity, at the proximal end 12 of the aerosol generating device 10. The cylindrical aerosol generating space 22 is arranged to receive a correspondingly shaped generally cylindrical aerosol generating article 1, 2 as described below in connection with FIGS. 2 and 3.

The aerosol generating device 10 comprises a magnetic field generator 24 for generating an electromagnetic field. The magnetic field generator 24 comprises a substantially helical induction coil 26. The induction coil 26 has a circular cross-section, extends around the cylindrical aerosol generating space 22 and has a longitudinal axis. The induction coil 26 can be energised by the power source 18 and controller 20. The controller 20 includes, amongst other electronic components, an inverter which is arranged to convert a direct current from the power source 18 into an alternating high-frequency current for the induction coil 26.

The aerosol generating device 10 includes one or more air inlets 28 in the device body 16 which allow ambient air to flow into the aerosol generating space 22. The aerosol generating device 10 also includes a mouthpiece 30 having an air outlet 32. The mouthpiece 30 is removably mounted on the device body 16 at the proximal end 12 to allow access to the aerosol generating space 22 for the purposes of inserting or removing an aerosol generating article 1, 2.

Referring to FIG. 2, there is shown a first example of an aerosol generating article 1 for use with the aerosol generating device 10. The induction coil 26 of the aerosol generating device 10 is also shown in FIG. 2 to clearly indicate how the aerosol generating article 1 is positioned relative to the induction coil 26 when the aerosol generating article 1 is positioned in the aerosol generating space 22.

As noted above, the aerosol generating article 1 is a "pod-type" article and has a substantially circular bottom wall 40, a substantially circular top wall 42 and substantially cylindrical side wall 44. The bottom wall 40 and the top wall 42 are typically air-permeable and can include a plurality of openings or perforations or can comprise a material with a porous structure which allows air to flow through the bottom wall 40 and the top wall 42 without the need for the openings or perforations.

The aerosol generating article 1 comprises first and second compartments 46, 48. The first and second compartments 46, 48 are discrete compartments which are separated by a partition wall 50 that can be substantially fluid-impermeable.

The first and second compartments 46, 48 contain respectively a first aerosol generating substance 52 and a second aerosol generating substance 54, and in some embodiments one of the first and second aerosol generating substances 52, 54 can comprise a nicotine source and the other of the first and second aerosol generating substances 52, 54 can comprise a delivery enhancing compound, such as pyruvic acid or lactic acid. In the illustrated first example, one of the first and second aerosol generating substances 52, 54 is a type of solid or semi-solid material and typically comprises plant derived material, and in particular tobacco. One or both of the first and second aerosol generating substances 52, 54 may also comprise an aerosol-former.

The aerosol generating article 1 includes an inductively heatable susceptor 56 which is configured to be inductively heated by the magnetic field generator 24, and in particular by the induction coil 26. The inductively heatable susceptor 56 comprises a first part 58 positioned in the first compartment 46 and a second part 60 positioned in the second compartment 48. The inductively heatable susceptor 56 comprises a plate susceptor which is generally L-shaped, with the second part 60 extending in a direction which is substantially perpendicular to the first part 58. In the first example of the aerosol generating article 1, the second part 60 of the inductively heatable susceptor 56 extends through the partition wall 50 from the first compartment 46 into the second compartment 48.

In a first implementation, the first and second parts 58, 60 of the inductively heatable susceptor 56 both comprise an inductively heatable material. As will be understood by one of ordinary skill in the art, when the induction coil 26 is energised during use of the aerosol generating device 10, an alternating and time-varying electromagnetic field is produced. This couples with the first and second parts 58, 60 of the inductively heatable susceptor 56 and generates eddy currents and/or magnetic hysteresis losses in the inductively heatable susceptor 56 causing the first and second parts 58, 60 to heat up. The heat is transferred from the first part 58 of the inductively heatable susceptor 56 to the first aerosol generating substance 52 in the first compartment 46, for example by conduction, radiation and convection. In a similar manner, the heat is transferred from the second part 60 of the inductively heatable susceptor 56 to the second aerosol generating substance 54 in the second compartment 48, for example by conduction, radiation and convection. Thus, the first and second aerosol generating substances 52, 54 are heated independently by the corresponding first and second parts 58, 60 of the inductively heatable susceptor 56. The partition wall 50 can comprise a thermally insulating material that is configured to minimise heat transfer between the first and second compartments 46, 48, so that the heating of the first and second aerosol generating substances 52, 54 can be carefully controlled.

The first and second aerosol generating substances 52, 54 are heated by the corresponding first and second parts 58, 60 of the inductively heatable susceptor 56 without being burned. The heating of the first and second aerosol generating substances 52, 54 releases one or more volatile compounds and generates first and second vapours (e.g. a nicotine vapour and a second vapour) which tend to mix and which may react as they flow through the air outlet 32 and which cool and condense to form an aerosol which can be inhaled by a user of the aerosol generating device 10 through the mouthpiece 30.

In the first implementation, the first and second parts 58, 60 of the inductively heatable susceptor 56 are configured to have different orientations from each other with respect to the induction coil 26, for example by virtue of the L-shaped geometry of the inductively heatable susceptor 56, when the aerosol generating article 1 is positioned in the aerosol generating space 22. In particular, the first part 58 of the inductively heatable susceptor 56 is configured so that it extends in a direction that is substantially parallel to the longitudinal axis of the induction coil 26, thereby ensuring a strong electromagnetic coupling between the first part 58 and the induction coil 26. Conversely, the second part 60 of the inductively heatable susceptor 56 is configured so that it extends in a direction that is substantially perpendicular to the longitudinal axis of the induction coil 26 to provide a weaker electromagnetic coupling between the second part 60 and the induction coil 26. The stronger electromagnetic coupling between the first part 58 of the inductively heatable susceptor 56 and the induction coil 26 may enable the first part 58 to be inductively heated to a first temperature which is higher than a second temperature to which the second part 60 is inductively heated by virtue of the weaker electromagnetic coupling between the second part 60 and the induction coil 26. Alternatively or in addition, the first part 58 may be heated to the first temperature more rapidly than the second part 60 is heated to the second temperature by virtue of the stronger electromagnetic coupling between the first part 58 and the induction coil 26. By heating the first and second parts 58, 60 to different first and second temperatures and/or at different rates, the heating within the first and second discrete compartments 46, 48 can be adapted for the different first and second aerosol generating substances 52, 54 so that an aerosol with improved characteristics can be generated.

In a second implementation, the first part 58 of the L-shaped inductively heatable susceptor 56 comprises an inductively heatable material and the second part 60 of the inductively heatable susceptor 56 comprises a non-inductively heatable material. Accordingly, when the induction coil 26 is energised during use of the aerosol generating device 10, the electromagnetic field generated by the induction coil 26 couples with the first part 58 of the inductively heatable susceptor 56 and inductively heats the first part 58 to a first temperature in the manner described above. A proportion of the heat generated in the first part 58 is transferred to the first aerosol generating substance 52 in the first compartment 46, for example by conduction, radiation and convection. A proportion of the heat generated in the first part 58 is also transferred by conduction to the second part 60, so that the second part 60 is heated conductively to a second temperature by the heat generated in the first part 56. Because the second part 60 is heated conductively, rather than inductively, the second part 60 is typically heated to a lower second temperature than the first temperature to which the first part 58 is inductively heated and/or the second part 60 is heated at a slower rate than the first part 58.

Referring to FIG. 3, there is shown a second example of an aerosol generating article 2 for use with the aerosol generating device 10. The induction coil 26 of the aerosol generating device 10 is also shown in FIG. 3 to clearly indicate how the aerosol generating article 2 is positioned relative to the induction coil 26 when the aerosol generating article 2 is positioned in the aerosol generating space 22. The aerosol generating article 2 is similar to the aerosol generating article 1 described above with reference to FIG. 2, and corresponding components are identified using the same reference numerals.

The aerosol generating article 2 comprises first and second compartments 46, 48 separated by a partition wall 50 and an inductively heatable susceptor 56 having first and second parts 58, 60. The first compartment 46 contains a first aerosol generating substance 52 and the first part 58 of the inductively heatable susceptor 56. The second compartment 48 contains a second aerosol generating substance 54 and the second part 60 of the inductively heatable susceptor 56.

Each of the first and second aerosol generating substances 52, 54 comprises a solid matrix 62, 64 and the first and second parts 58, 60 of the inductively heatable susceptor 56 are secured respectively in each solid matrix 62, 64. Each solid matrix 62, 64 typically comprises at least one of a porous ceramic and a foam material, for example in the form of a reconstituted tobacco mousse or an e-liquid mousse, which ensures that the first and second parts 58, 60 of the inductively heatable susceptor 56 are held securely in place in the respective first and second compartments 46, 48.

The first and second parts 58, 60 of the inductively heatable susceptor can be separate inductively heatable parts which are separated from each other in the first and second compartments 46, 48 and both of the first and second parts 58, 60 can comprise an inductively heatable material. When the aerosol generating article 2 is positioned in the aerosol generating space 22 during use of the aerosol generating device 10 and the induction coil 26 is energised, an alternating and time-varying electromagnetic field is produced. This couples with the first and second parts 58, 60 of the inductively heatable susceptor 56 and generates eddy currents and/or magnetic hysteresis losses in the inductively heatable susceptor 56 causing the first and second parts 58, 60 to heat up independently. The heat is transferred from the first part 58 of the inductively heatable susceptor 56 to the first aerosol generating substance 52 in the first compartment 46, for example by conduction, radiation and convection. In a similar manner, the heat is transferred from the second part 60 of the inductively heatable susceptor 56 to the second aerosol generating substance 54 in the second compartment 48, for example by conduction, radiation and convection. Thus, the first and second aerosol generating substances 52, 54 are heated independently by the corresponding first and second parts 58, 60 of the inductively heatable susceptor 56.

The first and second aerosol generating substances 52, 54 are heated by the corresponding first and second parts 58, 60 of the inductively heatable susceptor 56 without being burned. The heating of the first and second aerosol generating substances 52, 54 releases one or more volatile compounds and generates first and second vapours which tend to mix as they flow through the air outlet 32 and which cool and condense to form an aerosol which can be inhaled by a user of the aerosol generating device 10 through the mouthpiece 30.

As will be apparent from FIG. 3, the first and second parts 58, 60 of the inductively heatable susceptor 56 are plate susceptors and are both arranged so that they extend in a direction substantially parallel to the longitudinal axis of the induction coil 26, which is the optimum orientation for coupling with the electromagnetic field generated by the induction coil 26. In addition, the first part 58 is positioned closer to an inner circumference of the induction coil 26 than the second part 60 and due to the fact that the magnetic flux density increases from a minimum along a central longitudinal axis of the induction coil 26 to a maximum close to the inner circumference of the induction coil 26, the first part 58 of the inductively heatable susceptor 56 is inductively heated to a first temperature which is higher than a second temperature to which the second part 60 is inductively heated. Alternatively or in addition, the first part 58 may be heated to the first temperature more rapidly than the second part 60 is heated to the second temperature by virtue of its closer proximity to the inner circumference of the induction coil 26. As explained above, by heating the first and second parts 58, 60 to different first and second temperatures and/or at different rates, the heating within the first and second compartments 46, 48 can be adapted for the different first and second aerosol generating substances 52, 54 so that an aerosol with improved characteristics can be generated.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context. For example, the L-shaped inductively heatable susceptor 56 described in connection with the first example of FIG. 2 could be employed in the second example of FIG. 3, such that the first and second parts 58, 60 are secured in a solid matrix 62, 64 provided in each of the first and second compartments 46, 48. In this case, both the first and second parts 58, 60 of the inductively heatable susceptor 56 could comprise an inductively heatable material or the first part 58 could comprise an inductively heatable material whilst the second part 60 could comprise a non-inductively heatable material which is heated conductively by the first part 58. Conversely, an inductively heatable susceptor 56 comprising separate first and second parts 58, 60 as described in connection with the second example of FIG. 3 could be employed in the first example of FIG. 2.

Unless the context clearly requires otherwise, throughout the description and the claims, the words “comprise”, “comprising”, and the like, are to be construed in an inclusive as opposed to an exclusive or exhaustive sense; that is to say, in the sense of “including, but not limited to”.

The invention claimed is:

1. An aerosol generating article for use with an aerosol generating device including a magnetic field generator, the aerosol generating article comprising:

first and second discrete compartments configured to contain respectively a first aerosol generating substance and a second aerosol generating substance; and an inductively heatable susceptor configured to be inductively heated by the magnetic field generator, the inductively heatable susceptor having a first part positioned in the first compartment and a second part positioned in the second compartment, wherein the first and second parts of the inductively heatable susceptor are configured to have different orientations from each other with respect to the magnetic field generator.

2. The aerosol generating article according to claim 1, wherein the first and second parts of the inductively heatable susceptor are configured to be heated to first and second temperatures respectively, and one of the first and second temperatures is higher than the other of the first and second temperatures, and wherein the first and second parts of the inductively heatable susceptor are positioned with respect to the magnetic field generator so that the first part is heated to the first temperature more rapidly than the second part is heated to the second temperature.

3. The aerosol generating article according to claim 2, wherein the first and second parts of the inductively heatable susceptor are positioned in use with respect to the magnetic field generator so that the first part is heated to the first temperature more rapidly than the second part is heated to the second temperature.

4. The aerosol generating article according to claim 1, wherein the aerosol generating article contains a first aerosol generating substance in the first compartment and a second aerosol generating substance in the second compartment, each of the first and second aerosol generating substances comprises a solid matrix and the first and second parts of the inductively heatable susceptor are secured in the solid matrix of the respective first and second aerosol generating substances.

5. The aerosol generating article according to claim 4, wherein one of the first and second aerosol generating substances releases a nicotine vapour when heated and the other of the first and second aerosol generating substances releases a second vapour when heated, and wherein the nicotine vapour reacts with the second vapour to form an aerosol comprising nicotine salt particles.

6. The aerosol generating article according to claim 1, wherein the first part of the inductively heatable susceptor comprises an inductively heatable material and the second part of the inductively heatable susceptor comprises a non-inductively heatable material which is configured to be heated conductively by heat generated in the first part.

7. The aerosol generating article according to claim 1, wherein the inductively heatable susceptor comprises a plate susceptor shaped so that the second part extends from the first compartment into the second compartment.

8. The aerosol generating article according to claim 1, wherein the first and second compartments are separated by a substantially fluid-impermeable partition wall.

9. The aerosol generating article according to claim 8, wherein the partition wall comprises a thermally insulating material configured to minimise heat transfer between the first and second compartments.

10. The aerosol generating article according to claim 8, wherein the inductively heatable susceptor extends through the partition wall.

11. An aerosol generating system comprising:

a magnetic field generator comprising a substantially helical induction coil having a longitudinal axis; and an aerosol generating article comprising:

first and second discrete compartments configured to contain respectively a first aerosol generating substance and a second aerosol generating substance; and an inductively heatable susceptor configured to be inductively heated by the magnetic field generator, the inductively heatable susceptor having a first part positioned in the first compartment and a second part positioned in the second compartment wherein:

the first and second compartments are positioned inside the helical induction coil; and the first part of the inductively heatable susceptor extends in a direction substantially parallel to the longitudinal axis of the induction coil and the second part of the inductively heatable susceptor extends in a direction that intersects the first part, and wherein the direction along which the second part extends is substantially perpendicular to the direction along which the first part extends.

12. The aerosol generating system according to claim 11, wherein:

the first and second parts of the inductively heatable susceptor are configured to be heated to first and second temperatures respectively, and one of the first and second temperatures is higher than the other of the first and second temperatures; and the first and second parts of the inductively heatable susceptor are positioned with respect to the magnetic field generator so that the first part is heated to the first temperature more rapidly than the second part is heated to the second temperature.

13. An aerosol generating system comprising:

a magnetic field generator comprising a substantially helical induction coil having a longitudinal axis; and an aerosol generating article comprising:

first and second discrete compartments configured to contain respectively a first aerosol generating substance and a second aerosol generating substance; and an inductively heatable susceptor configured to be inductively heated by the magnetic field generator, the inductively heatable susceptor having a first part positioned in the first compartment and a second part positioned in the second compartment wherein:

the first and second compartments are positioned inside the helical induction coil; and the first part of the inductively heatable susceptor extends in a direction substantially parallel to the longitudinal axis of the induction coil and the second part of the inductively heatable susceptor extends in a direction that intersects the first part an aerosol generating device in which the magnetic field generator is incorporated, the aerosol generating device including a cavity having a longitudinal axis, wherein the helical induction coil extends around the cavity such that the longitudinal axes of the helical induction coil and the cavity are substantially parallel.

14. The aerosol generating system according to claim 13, wherein:

the first and second parts of the inductively heatable susceptor are configured to be heated to first and second temperatures respectively, and one of the first and second temperatures is higher than the other of the first and second temperatures; and the first and second parts of the inductively heatable susceptor are positioned with respect to the magnetic field generator so that the first part is heated to the first temperature more rapidly than the second part is heated to the second temperature.

* * * * *